(12) United States Patent
Bell

(10) Patent No.: US 8,365,765 B2
(45) Date of Patent: Feb. 5, 2013

(54) FLOW RESTRICTOR CARTRIDGE FOR FLUID FLOW MEASUREMENTS

(76) Inventor: Joel David Bell, Katy, TX (US)

(*) Notice: Subject to any disclaimer, the term of this patent is extended or adjusted under 35 U.S.C. 154(b) by 974 days.

(21) Appl. No.: 12/207,876

(22) Filed: Sep. 10, 2008

(65) Prior Publication Data

US 2009/0065061 A1 Mar. 12, 2009

Related U.S. Application Data

(60) Provisional application No. 60/971,183, filed on Sep. 10, 2007.

(51) Int. Cl.
*F16K 15/00* (2006.01)
(52) U.S. Cl. .................. 137/551; 138/44; 73/861.52
(58) Field of Classification Search .................. 137/551; 138/44; 73/861.52, 861.61, 861.63, 861.64
See application file for complete search history.

(56) References Cited

U.S. PATENT DOCUMENTS

| | | | |
|---|---|---|---|
| 2,007,036 A * | 7/1935 | Cornell ........................... | 138/44 |
| 2,661,768 A * | 12/1953 | Novak et al. .................... | 138/44 |
| 3,025,878 A | 3/1962 | Hupp | |
| 3,654,960 A | 4/1972 | Kiernan | |
| 3,877,895 A * | 4/1975 | Wonderland et al. ........... | 138/44 |
| 4,237,739 A | 12/1980 | Owen et al. | |
| 4,926,698 A | 5/1990 | Owen | |
| 5,036,884 A | 8/1991 | Miller et al. | |
| 5,458,006 A | 10/1995 | Roqueta | |
| 5,463,908 A | 11/1995 | Rosolia | |
| 5,672,832 A | 9/1997 | Cucci et al. | |
| 5,803,123 A | 9/1998 | Bell et al. | |
| 5,848,607 A | 12/1998 | Bell et al. | |
| 6,058,787 A | 5/2000 | Hughes | |
| 6,649,829 B2 * | 11/2003 | Garber et al. .................. | 137/177 |
| 6,672,173 B2 | 1/2004 | Bell | |
| 6,725,731 B2 * | 4/2004 | Wiklund et al. ........... | 73/861.52 |
| 6,953,919 B2 | 10/2005 | Clothier | |
| 7,357,040 B2 | 4/2008 | Bell | |
| 7,533,698 B2 * | 5/2009 | Nolfi et al. ...................... | 138/89 |
| 2007/0034018 A1 | 2/2007 | Bell | |

OTHER PUBLICATIONS

Notification Concerning Transmittal of International Preliminary Report on Patentability (Chapter I of the Patent Cooperation Treaty) mailed Mar. 25, 2010 based on PCT/US08/75829, International Preliminary Report on Patentability issued Mar. 16, 2010, 6 pages.
Notification of Transmittal of the International Search Report and the Written Opinion of the International Searching Authority, or the Declaration mailed Nov. 18, 2008 based on PCT/US08/75829, 7 pages, Form PCT/ISA/220/210 and Form PCT/ISA/237.

* cited by examiner

*Primary Examiner* — Eric Keasel
(74) *Attorney, Agent, or Firm* — Charles Knobloch; Arnold, Knobloch & Saunders, L.L.P.

(57) ABSTRACT

A flow restriction member having a cylindrical body and two ends, a two-faced flange disposed radially about the body, and a hub formed by the outer surface of the body not otherwise disposed by the two-faced flange. The flow restriction member further includes a first conically-shaped circular torus opening disposed on one end of the body, the torus opening progressively reducing in cross-sectional area along the longitudinal axis into the body, a second conically-shaped circular torus opening disposed on the other end of the body, the torus opening progressively reducing in cross-sectional area along the longitudinal axis into the body, and a sill opening disposed between the first and the second torus openings, the sill opening of constant cross-sectional area along the longitudinal axis of the body. In one example, a handle disposed radially from the two-faced flange and an RFID tag disposed within the handle.

17 Claims, 7 Drawing Sheets

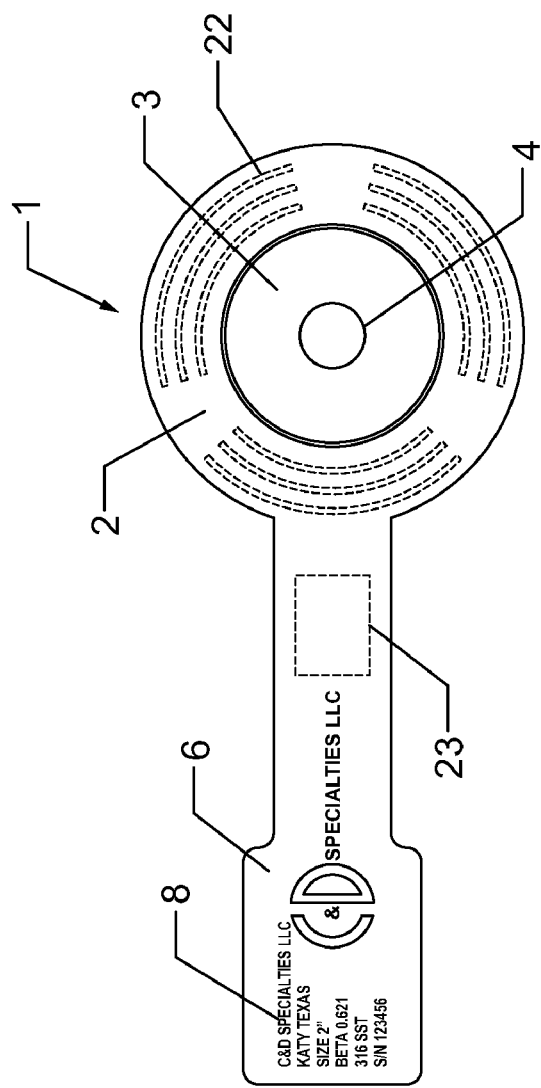
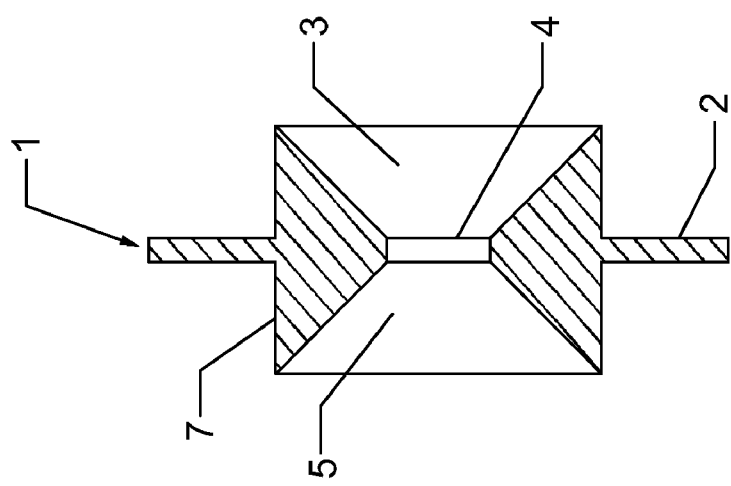
FIG. 2
FIG. 1

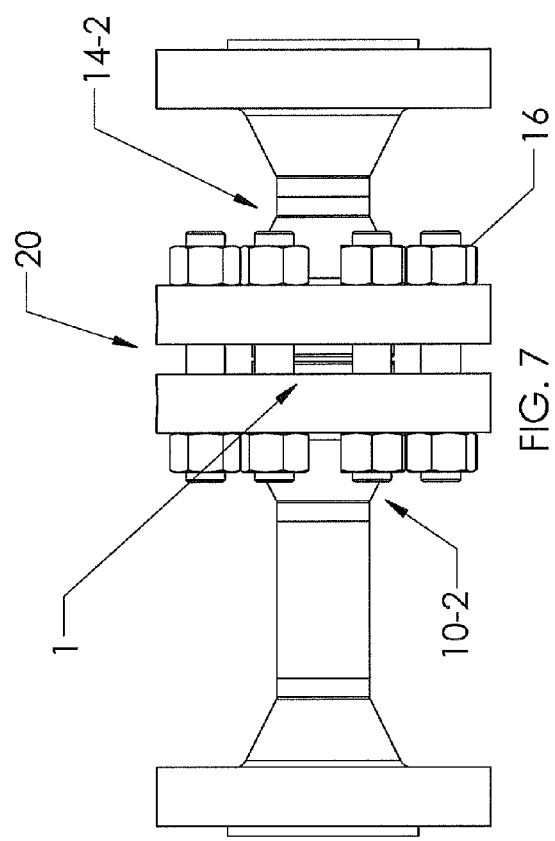
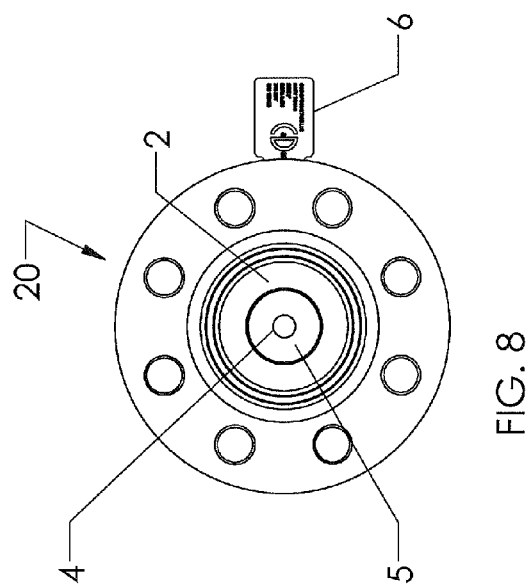
FIG. 7
FIG. 8

FLOW RESTRICTOR CARTRIDGE FOR FLUID FLOW MEASUREMENTS

STATEMENT OF RELATED CASES

This application claims the benefit of U.S. Provisional Application No. 60/971,183, filed Sep. 10, 2007.

FIELD OF THE INVENTION

This invention relates to flow meters and in particular to a flow meter restriction member, method, or system that employs a flow restriction, which has a circular opening at the center axillary location of the restriction.

BACKGROUND OF THE INVENTION

Examples of wedge-shaped flow meters are described in U.S. Pat. No. 4,237,739, which issued Dec. 9, 1980, and U.S. Pat. No. 4,926,698, which issued May 22, 1990. The '739 patent describes a flow meter which utilizes one wedge whereas the '698 patent describes a flow meter utilizing two wedges mounted on opposing sides of the tubular body or housing of the flow meter. These wedges in both patents require the flow to travel down the face of each wedge allowing the stream to flair out and contact the tube or cylinder wall, in which the wedge is mounted.

Examples of torus-shaped flow meters are described in U.S. Pat. No. 7,357,040, which issued Apr. 15, 2008 to Bell.

Accurate positioning and alignment of the fluid flow restriction member has continued to be a challenge. Accurate positioning of the flow restriction member, relative to the upstream and downstream sensors, is important in order to achieve reliable fluid flow measurements. Alignment of the flow restriction member, generally perpendicular to the direction of fluid flow, is important to prevent over pressuring of the member and to prevent distortion or bending of the member. Even though the wear component is usually only the flow restriction member, replacement in the field of only the flow restriction member has been impractical. Conditions in the field, such as those experienced along a pipeline, present difficult challenges in replacement of a flow restriction member. Performing the replacement procedure would require intricate position and alignment of the flow restriction member and intricate confirmation measurements. Several pieces would have to be positioned, aligned, and calibrated. The alignment and positioning with respect to the sensors and the direction of fluid flow have rendered field replacement impractical and unreliable unless the sensors and the flow restriction member are replaced as a single unit. There has been a long felt need to be able to replace the flow restriction member with greater ease and greater reliability while maintaining or even improving the measurement accuracy and repeatability. Further, there is a need to confirm that indeed a properly sized flow restriction member has been installed and also a need to track the history of the flow restriction member for maintenance prediction and/or application of correction factors to the measurements.

SUMMARY OF THE INVENTION

In a first set of examples of the present invention, a device is disclosed for conditioning a flow of fluid. The device includes: a flow restriction member having a cylindrical body and two ends; a two-faced flange disposed radially about the body of the flow restriction member; a hub formed by the outer surface of the body not otherwise disposed by the two-faced flange. The flow restriction member further includes: a first conically-shaped circular torus opening disposed on one end of the body, the torus opening progressively reducing in cross-sectional area along the longitudinal axis into the body; a second conically-shaped circular torus opening disposed on the other end of the body, the torus opening progressively reducing in cross-sectional area along the longitudinal axis into the body; and a sill opening disposed between the first and the second torus openings, the sill opening of constant cross-sectional area along the longitudinal axis of the body.

In another example, the device includes: a handle disposed radially from the two-faced flange, whereby information related to the flow restriction member I communicated after the flow restriction member is positioned, aligned, and sealed within the fluid flow path. In a further example, an RFID tag is disposed within the handle, whereby information related to the flow restriction member is communicated.

In another example, the device includes: an RFID tag disposed radially from the body of the flow restriction member, whereby information related to the flow restriction member is communicated after the flow restriction member is positioned, aligned, and sealed within the fluid flow path.

In a second set of examples of the present invention, a system is disclosed for conditioning a flow of fluid. The system includes: a means for restricting the flow of fluid within the fluid flow path; a means for positioning the flow restriction means within a fluid flow path; a means for aligning the flow restriction means within the fluid flow path; and a means for sealing the flow restriction means within the fluid flow path. The means for restricting includes: means for progressively reducing the cross-sectional area of the fluid flow path; means for maintaining a constant cross-sectional area of the fluid flow path after the fluid flow path has been progressively reduced; and means for increasing the cross-sectional area of the fluid flow path after the fluid flow path has been maintained at a constant cross-sectional area.

In another example, the system further includes means for communicating information related to the flow restriction member after the flow restriction member is positioned, aligned, and sealed within the fluid flow path.

In another example, the means for positioning includes a two-faced flange.

In another example, the means for aligning comprises a hub.

In another example, the means for sealing comprises a two-faced flange and circular ridges disposed on the faces of the flange.

In a third set of examples of the present invention, a method is disclosed for conditioning a flow of fluid. The method includes the steps of: positioning a flow restriction member within a fluid flow path; aligning the flow restriction member within the fluid flow path; sealing the flow restriction member within the fluid flow path; ans restricting the flow of fluid within the fluid flow path. The step of restricting includes the steps of: progressively reducing the cross-sectional area of the fluid flow path; maintaining a constant cross-sectional area of the fluid flow path after the fluid flow path has been progressively reduced; and increasing the cross-sectional area of the fluid flow path after the fluid flow path has been maintained at a constant cross-sectional area.

In another example, the method further includes the step of communicating information related to the flow restriction member after the flow restriction member is positioned, aligned, and sealed within the fluid flow path.

In an example, the flow conditioning member employs two angled ramps one on each side of a flat located in the center. The ramps are formed from the outer wall to an axillary opening or aperture. Fluid is restricted by the ramps to flow through the aperture. These ramps start with the leading edge having the same diameter as the inside diameter of the flow pipe. These ramps condition the flow of the fluid and provide a stabilization of fluid flow.

Other examples and sets of examples are further disclosed. In particular, a method is disclosed for conditioning a flow of fluids. The method includes the steps of: progressively reducing the cross-sectional area of fluid flow; maintaining a constant cross-sectional area of fluid flow for a distance following the reducing portion; and increasing the cross-sectional area of fluid flow beyond the constant diameter portion.

In further example, a method is disclosed for conditioning a flow of fluids. The method includes the steps of: progressively reducing the diameter of fluid flow, maintaining a constant diameter of fluid flow for a distance following the reducing portion, and increasing the diameter of fluid flow beyond the constant diameter portion.

In examples of the present invention, the flow restriction uses a cylinder opening and ramps located in a 360° circle on the inlet and outlet, enabling flow conditioning of the stream. The differential pressure produced by this combination of ramps provides a controlled flow stream for the development of the coefficient of discharge factor. This coefficient of discharge factor is a relationship between the actual flow and the theoretical flow, which equals the energy needed to obtain the flow required. The most recognized meter for fluid measurement using differential pressure is an orifice plate. This device uses a circular opening on a flat plate for creating a differential pressure generated by the energy necessary to flow the fluid thought said circular opening. The factor of the orifice flow meter, range from around 0.600. Examples of the present invention have a tested factor ranging from 0.899 to 1.0104.

In another set of examples of the present invention, a device or system is disclosed. The device or system includes: a means for restricting flow of fluids, means for aligning the flow restriction means within the flow of fluid, means for positioning the flow restriction means within the flow of fluid, means for sealing the flow restriction means with the member that contains the flow of fluid, and means for communicating information related to the flow restriction means while the flow restriction means is positioned and sealed within the flow of fluid.

In a further example, the flow restriction means includes a restriction of progressively reducing cross-sectional area along the path of fluid flow. In a further example, the reduction of cross-sectional area is uniform relative in the directions radial to the path of fluid flow. Specifically, the flow restrictor is conically shaped (a 360 degree torus) so as to reduce the diameter of the path of fluid flow, causing the flow of fluid to pass through a circular aperture having a smaller diameter than the diameter of the pipe that contains the fluid flow. In further example, the circular aperture is held to a constant diameter along a portion of the fluid flow path. The diameter past the aperture is increased or returned to the original diameter. In further example, the reduction in diameter prior to the aperture and increase in diameter after the aperture are essentially opposite and equal.

In a further example, the flow restriction means includes a restriction of progressively reducing cross-sectional area along a portion of the path of fluid flow, followed by a restriction of constant cross-sectional area along a further portion of the path of fluid flow, followed by a restriction of progressively increasing cross-sectional area along the path of fluid flow. In a further example, the surface area is distributed uniformly relative in the direction radial to the path of fluid flow.

In a further example, the aligning means includes a paddle affixed to, or otherwise in structural communication with, the flow restriction means.

In a further example, the positioning means includes a faceplate disposed around the flow restriction means. In a further example, the aligning means are disposed on the positioning means.

In a further example, the sealing means includes at least one ridge disposed on the positioning means. In a further example, the ridge is circularly disposed about the faceplate. In a further example, an o-ring seal is engageably received by the circular ridge.

In a further example, the communicating means includes an RFID tag disposed on or in the device. In a further example, the RFID tag is disposed on or in the paddle. In an example, the communicating means includes identification information imprinted on the paddle.

In another set of examples, fluid flow comprises gas, liquids, or combination of gas and liquid. Solids may be transported with, or otherwise included in, the fluid flow. A mixture of different gases and/or different liquids may be present. Specifically, fluid flow can comprise hydrocarbon and other gases, water, petroleum liquids, sludges, sand, clays, and/or debris.

In further example, the flow restriction means are positioned between two means for detecting pressure of the flow of fluid. In a particular example, the detecting means comprise orifices for sampling pressure of the flow of fluid.

In an set of examples, the device is called an insert. The insert sets inside the bore of a pipe. This configuration allows all flow to travel up the 360 degree ramp on the inlet side and down the outlet ramp, enabling all liquid and gas to move through the throat of the torus. The throat is the same as a standard orifice area, thickness without a normal bevel in the throat. The bevel for this orifice is a 45 degree ramp rotated through 360 degrees.

In another set of examples of the invention, a non-mechanical flow measurement cartridge is disclosed. In a further example, a cartridge is provided which provides a connectable conduit such that the cartridge extends across the conduit and all fluid flowing in the conduit passes through the cartridge measurement vortex.

In another example, a self-contained non-mechanical flow measurement cartridge is provided for the measurement of flow in a conduit. The cartridge is configured for removable insertion into a meter while the meter is in-situ in the conduit.

In another example, a self-contained non-mechanical flow measurement cartridge is provided for providing the flow restriction of the fluid in a conduit located axially aligned in the conduit along the circular vortex of the cartridge, assisted by the 360 degree inlet and outlet ramps.

In another example, the cartridge is arranged to provide a fluid flow restriction which creates a differential pressure which can be measured through the pressure tap locations in a conduit both upstream and downstream of the cartridge.

In another example, the cartridge contains pressure taps, which are located upstream and downstream of the central vortex located along the center axis of the cartridge at a set distance. In a further example, the desired set distance is known in the art of flow measurement.

In another example, the cartridge is configured to be aligned in the axial center of the conduit.

In another example, the mounting comprises a flange arranged to be clamped between the adjacent flanges of the flow meter located in a pipeline.

In another example, a projection for clamping between adjacent flanges is further provided. A gasket seal located on either side of the projection is further provided.

In another example, the cartridge is insertable into a pocket located in both adjacent flanges and a gasket seal obtained between the normal sealing faces of standard type flanges, thereby maintaining a fluid-tight seal.

In another example, the cartridge is insertable into in a cannular holder, which is insertable into in a conduit.

In another example, the cartridge is insertable between two opposing 90 degree elbows.

In another example, the cartridge has two pressure taps (upstream and downstream) insertable between two tri-clamp flanges.

In another example, the cartridge is insertable in a hammer union seal.

In another example, the cartridge has ascending and descending angle ramps of engineered degrees to provide accurate measurement of fluid flow.

In another example, the inlet has a convergent for conditioning the stream on a 360 degree circular vortex and a flat surface for fluid flow prior exiting in a divergent condition for fluid flow stabilization.

In another example, the cartridge has a handle which has data describing the cartridge.

In another example, the cartridge has an RFID identifier or otherwise has information electronically disposed thereon or therein. In a further example, the identifier or other information is communicable or connected to monitoring communication equipment.

In another example, the cartridge's RFID identifier is either active, passive, or manual reading, or any combination of active, passive, and manual reading.

In another example, a handle provides company name, address, size, beta ratio, material of manufacture, or serial number, or any combination of company name, address, size, beta ratio, material of manufacture, and serial number. In a further example, the handle contains a variety of data related to the cartridge and/or surrounding environment.

In another set of examples, a metal-to-gasket sealing mechanism is disclosed for efficient installation and removal of a flow meter within a pipeline. This sealing flange is located at any location on the length of the tube housing the flow restriction member.

In one example, a means is disclosed for providing various types of flow restrictions that are easily installed and removed. The flow meter assembly comprises a metal-to-metal seal or a metal-to-gasket seal located on either or both sides of the flange located at any point along the tubular body that forms the torus 360° degree wedge. The tubular body that forms the torus 360° degree wedge has both a left section and right section that begins at the start of the formed angle from the outer wall and joins the flat located at the axillary's center of the flow meter assembly device therein.

In an example operation, fluid velocity increases due to contraction of fluid volume at the entrance to the restriction. The restriction is known as the flat within the middle section located between the left and right section of the flow meter assembly. The kinetic energy of the fluid increases. Sensing ports for receiving two pressure-sensing devices measure the differential pressure of the fluid flowing through the flow meter assembly. The sensing ports are located at locations along the tubular body, preferably one upstream of the flat and one downstream of the flat.

In another example, a method and apparatus is disclosed for measuring the flow of a fluid through a pipeline. The method includes the steps of: providing an assembled flow meter comprising a metal-to-metal sealed multi-section tubular body having a left section, a middle section, and a right section; and selecting a middle section with a specific type of measurement device incorporated therein. The middle section is installed between the left section and the right section. The assembled flow meter device is coupled within the fluid flow path of a pipeline, and the pressure differential on each side of the flow restrictor is then measured.

BRIEF DESCRIPTION OF THE DRAWINGS

FIG. 1 illustrates a side cut-away view of an example flow restriction member of the present invention.

FIG. 2 illustrates a facing view of an example flow restriction member.

FIG. 7 illustrates a 3-D perspective view of a flow restriction member, as assembled in flanges as a flow meter assembly bolted together by bolts.

FIG. 8 illustrates an end-on view of the flow meter assembly of FIG. 7, illustrating a view of the aperture (orifice).

DETAILED DESCRIPTION OF EXAMPLES OF THE INVENTION

Figure 3:
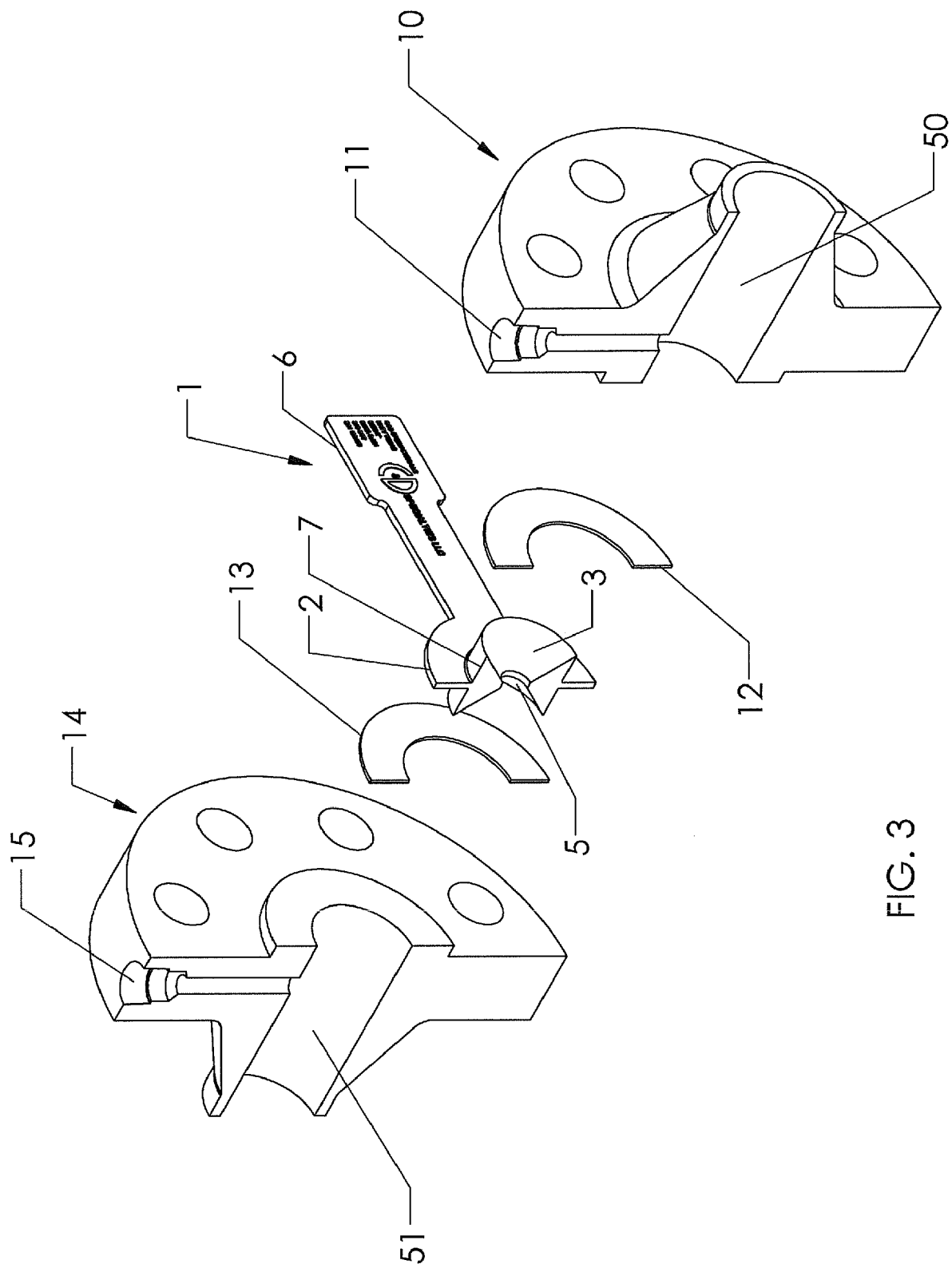
FIG. 3 illustrates a one-half cut-away exploded 3-D perspective view of a flow restriction member as would be assembled in flanges that contain flow meter sensor orifices.

FIG. 1 illustrates a side cut-away view of a flow restriction member 1, an example of the present invention. Flow restriction member 1 may be called an insert or a cartridge. An integrated flange 2 enables alignment, positioning, and sealing of the flow restriction member with a pipe or conduit, the pipe providing the fluid flow to be measured. As seen in FIG. 1, integrated flange 2 is a two-faced flange. In one example, serrated or circular ridges may be disposed on the faces of flange 2 (not illustrated) to improve the sealing characteristics of the flange. Flow is restricted by progressively decreasing the diameter of the fluid flow path, shown by conical inlet ramp 3. The ramp is also called a wedge. A portion of the opening in the flow restriction member is maintained at a constant diameter, shown by sill 4. Sill 4 forms a central vortex and is also called a throat or a flat. Flow is unrestricted by progressively increasing the diameter of the fluid flow path, shown by conical outlet ramp 5. The ramp is also called a wedge. Examples of the present invention use the 360 degree ramps to stabilize the flow prior to the passage across the flat of the throat of the flow insert.

The total length of flow restriction member 1 in the axial direction includes the length of inlet ramp 3, sill 4, and outlet ramp 5. The axial length of flow restriction member 1 that is in excess of the thickness of two-faced flange 2 forms hubs 7 on each side of flange 2. The outside diameter of hubs 7 is set to fit into the inside diameter of a receiving flange, pipe, or conduit (as will be illustrated in the following Figures).

FIG. 2 illustrates a facing view of flow restriction member 1. Handle 6 enables alignment and positioning of the flow restriction member with a pipe or conduit. In one example, handle 6 is integrated into flange 2 and ramp 3 and sill 4 to form a single integrated component. Further, identification information 8 is disposed on handle 6, providing means for communicating information related to the flow restriction means while the flow restriction means is positioned and sealed within the flow of fluid. In a further example, an RFID tag ("radio frequency identification tag", not illustrated) or other embedded electronics is disposed upon or in handle 6 and/or flange 2. Ramp 3 is shown in the axial center of flange 2, intersecting a hole, aperture, throat, or sill 4. Ramp 5 is not illustrated, being on the reverse side of flow restriction member 1.

FIG. 3 illustrates a one-half cut-away exploded 3-D perspective view of flow restriction member 1 as would be assembled in flanges that contain flow meter sensor orifices. Flow meter flange 10 contains fluid flow path 50 and a sensor orifice 11. Sensor orifice 11 is used to sample pressure upstream of flow restriction member 1. Gasket 12 seals flange 10 with one side of flange 2 of flow restriction member 1. The cut-away of flow restriction member 1 further illustrates ramp 3, sill 4, ramp 5, flange 2, and handle 6. Gasket 13 seals flow meter flange 14 with the other side of flange 2 of flow restriction member 1. Flange 14 contains fluid flow path 51 and a sensor orifice 15. Sensor orifice 15 is used to sample pressure downstream of flow restriction member 1.

Figure 4:
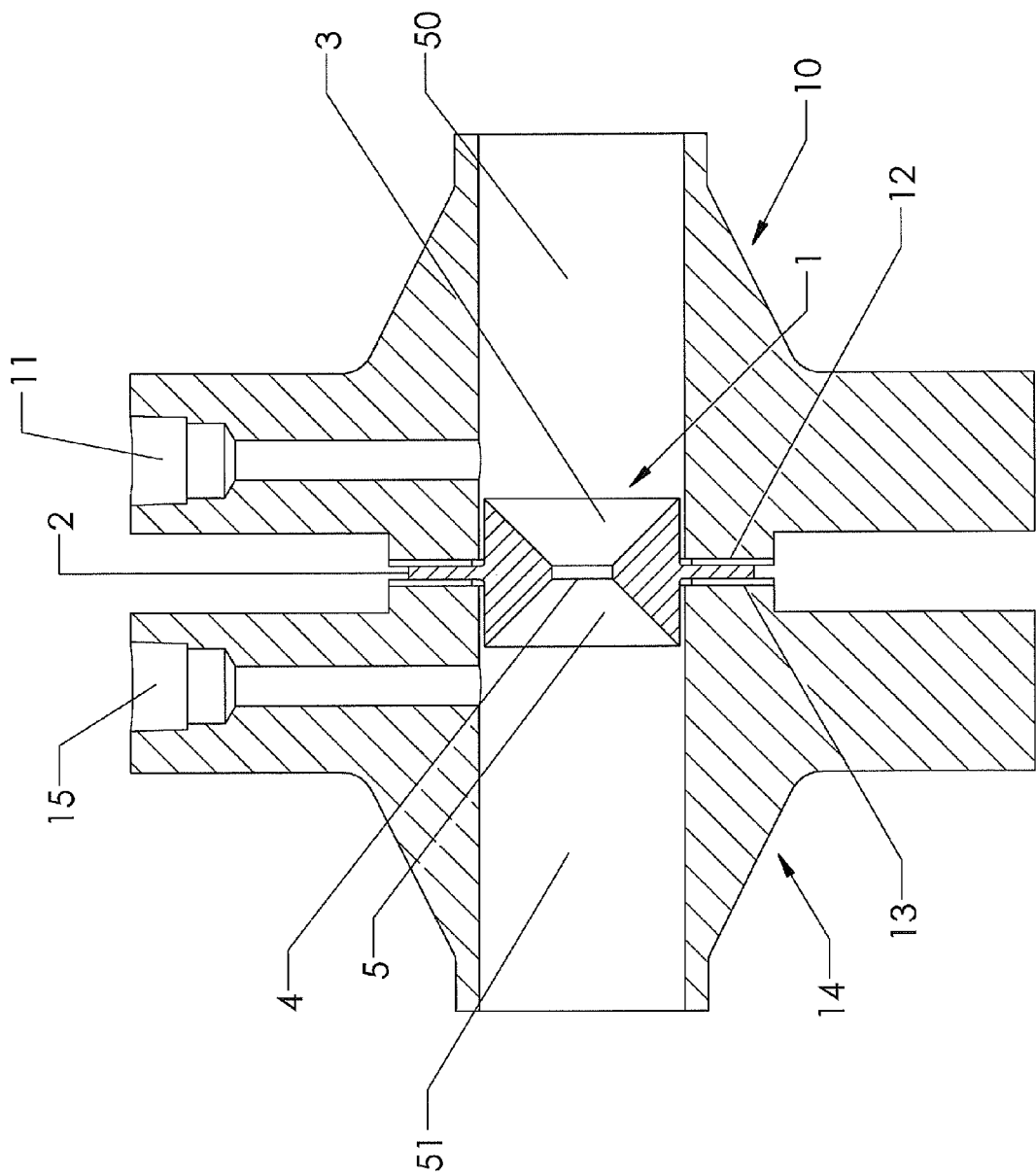
FIG. 4 illustrates a side cut-away view of a flow restriction member as assembled in flanges that contain flow meter sensor orifices.

FIG. 4 illustrates a side cut-away view of flow restriction member 1 as would be assembled in flanges that contain flow meter sensor orifices. Flow meter flange 10 contains fluid flow path 50 and a sensor orifice 11. Gasket 12 is shown disposed between flange 2 and flow meter flange 10. Flow restriction member 1 is joined to flange 10. Gasket 13 is shown disposed between flange 2 and flow meter flange 14. The cut-away of flow restriction member 1 further illustrates ramp 3, sill 4, ramp 5, and flange 2. Handle 6 is not illustrated. Flange 14 contains fluid flow path 51 and a sensor orifice 15. Flange 14 is joined to flange 10 with flow restriction member 1 disposed in between flange 10 and flange 14. Fluid flow path 50 communicates with fluid flow path 51 through the central vortex formed by sill 4 of flow restriction member 1. In typical examples, the outside diameter of flow restriction member 1 is within standard machining tolerance of the inside diameter of fluid flow path 50 and fluid flow path 51.

FIGS. 3 and 4 illustrate the operable functioning of flow restriction member 1. In particular, two-faced flange 2 operates to position flow restriction member 1 the correct distance from sensor orifices 11 and 15. Special adjustment or confirmation measurements in-the-field is not required in order to properly position the flow restriction member. Hubs 7 are not subject to skewing of rotation in the longitudinal direction as they insure proper alignment of flow restriction member 1 in the path of fluid flow. In this example, flow restriction member is aligned such that the vortex of sill 4 is aligned and maintained perpendicular to fluid flow paths 50 and 51. Special adjustment or confirmation measurements in-the-field is not required in order to properly align the flow restriction member. These functions are made possible by the torus wedge structure of the flow restriction member, which enables the flange and hubs to be formed as a single integrated structural member. Working in combination, the flow conditioning aspects of the torus wedge vortex, when working together with the means for positioning as provided by the two-faced flange, and the means for aligning as provided by the hubs, enable field-replacement of the flow restrictor by itself without replacement of the sensors and/or sensor housing and without use of precision, laboratory-grade equipment.

Figure 5:
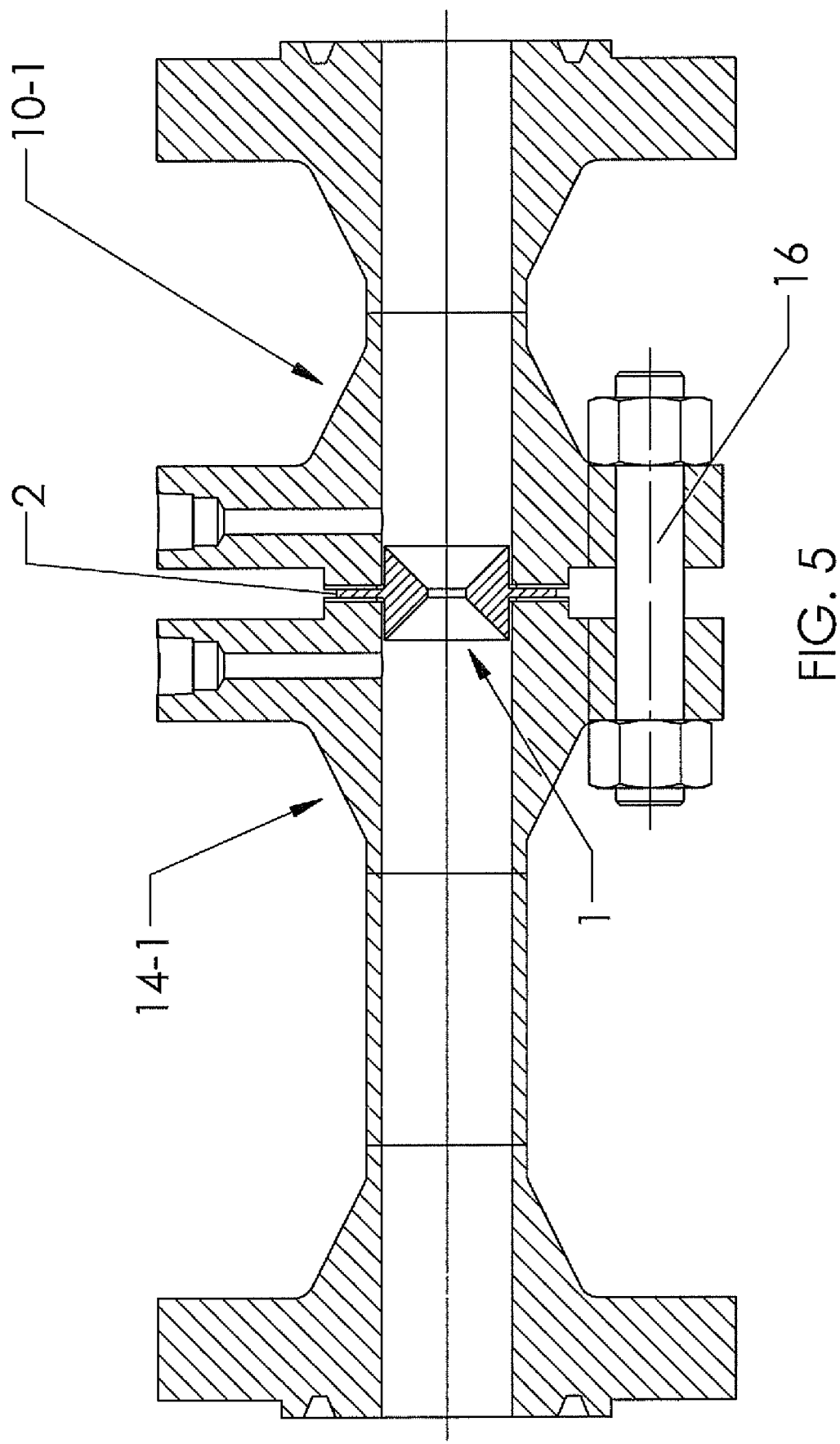
FIG. 5 illustrates another example of a flow restriction member joined with flanged pipes.

FIG. 5 illustrates another example of flow restriction member 1 joined with flanged pipes 10-1 and 14-1. Bolts 16 provide pressure to seal flanges 10-1, 2, and 14-1 together.

Figure 6:
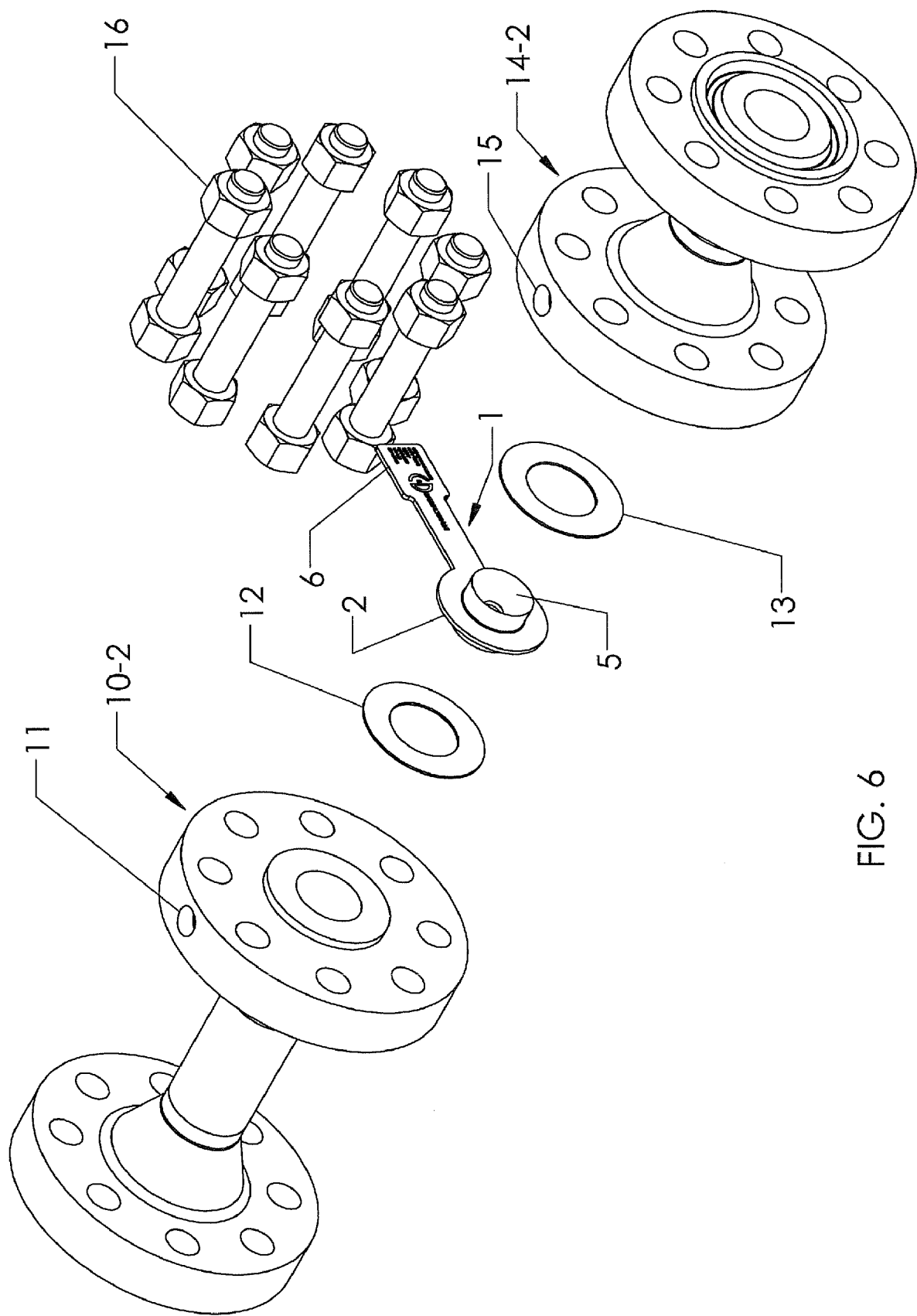
FIG. 6 illustrates an exploded 3-D perspective view of a flow restriction member as would be assembled in flanges that contain flow meter sensor orifices.

FIG. 6 illustrates an exploded 3-D perspective view of flow restriction member 1 as would be assembled in flanges that contain flow meter sensor orifices. Flow meter flange 10-2 contains fluid flow path 50 and a sensor orifice 11. Sensor orifice 11 is used to sample pressure upstream of flow restriction member 1. Gasket 12 seals flange 10-2 with one side of flange 2 of flow restriction member 1. Flow restriction member 1 is further illustrated with ramp 5, flange 2, and handle 6. Gasket 13 seals flow meter flange 14-2 with the other side of flange 2 of flow restriction member 1. Flange 14-2 contains fluid flow path 51 and a sensor orifice 15. Sensor orifice 15 is used to sample pressure downstream of flow restriction member 1. Bolts 16 provide pressure to seal flanges 10-2, 2, and 14-2 together.

FIG. 7 illustrates a 3-D perspective view of flow meter flange 10-2, flow restriction member 1, and flow meter flange 14-2 formed as a flow meter assembly 20 when bolted together by bolts 16.

FIG. 8 illustrates an end-on view of flow meter assembly 20, illustrating a view of the aperture (orifice) created by the intersection of sill 4 with ramp 5. Handle 6 is shown protruding from assembly 20, providing ready access for reading the identification information and confirming proper positioning and alignment of flow restriction member 1.

Figures 9, 10:
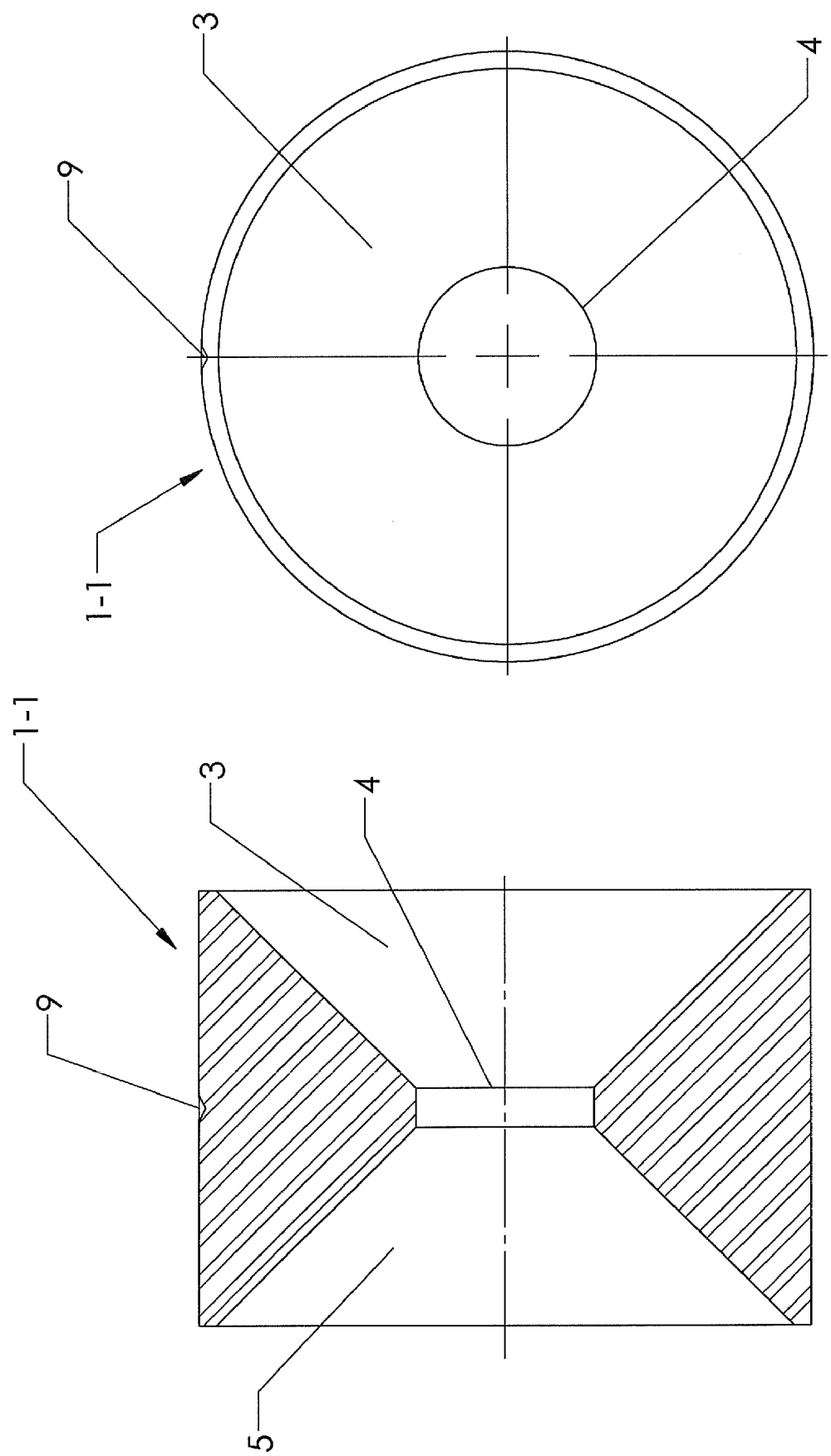
FIG. 9 illustrates a side cut-away view of a flangeless example of a flow restriction member.
FIG. 10 illustrates a facing view of a flangeless example of a flow restriction member.

FIG. 9 illustrates a side cut-away view of a flow restriction member 1-1, a flangeless example. Flow restriction member 1-1 may be called an insert or a cartridge. Alignment, positioning, and sealing of the flow restriction member is accomplished by placement of flow restriction member 1-1 into a receiving flange (not illustrated) that has a recessed well to receive flow restriction member 1-1. Flow is restricted by progressively decreasing the diameter of the fluid flow path, shown by conical inlet ramp 3. A portion of the opening in the flow restriction member is maintained at a constant diameter, shown by sill 4. Sill 4 forms a central vortex and is also called a throat. Flow is unrestricted by progressively increasing the diameter of the fluid flow path, shown by conical outlet ramp 5. In one example, a set screw point 9 provides the positioning location for flow restriction member 1-1.

FIG. 10 illustrates a facing view of flow restriction member 1-1. Ramp 3 is shown in the axial center of flow restriction member 1-1, intersecting a hole, aperture, throat, or sill 4. Ramp 5 is not illustrated, being on the reverse side of flow restriction member 1-1. Set screw point 9 provides the positioning location for flow restriction member 1-1.

In another example, the cartridge also contains pressure taps located upstream and downstream of the central vortex and located along the center axis of the cartridge at a set distance. In another example, the cartridge is insertable into a pocket located in both adjacent flanges, with a gasket seal obtained between the normal sealing faces of standard type flanges, thereby maintaining a fluid-tight seal. In another example, the cartridge is insertable into in a cannular holder, which is insertable into in a conduit.

In another example, an assembled flow meter has a metal-to-metal sealed multi-section tubular body. The sections include a left section, a middle section, and a right section. A specific type of measurement device, such as flow restriction member 1-1, is used for the middle section. The middle section is installed between the left section and the right section. The assembled flow meter device is coupled within the fluid flow path of a pipeline, and the pressure differential on each side of the flow restrictor is then measured.

In a preferred example, ramp 3 and ramp 5 have dimensions of eight inches diameter, reducing to four inches diameter at sill 4, using a reduction angle of 45 degrees, and sill 4 having the four inches diameter and 0.125 inch length or thickness, producing a beta ratio of 0.5. Prior art beta ratios typically range from 0.2 to 0.75. In present examples of the invention, beta ratios can vary at least from 0.1 to 0.9. Other flow meter designs incorporate ramps for flow conditioning, however the ramps as found in a Venturi or flow nozzle incorporate different angles for different solutions.

Accordingly, Applicant has invented a new and non-obvious device, method, and system for the conditioning of a flow of fluid for the purpose of flow measurements.

Various aspects of the invention, including alternative embodiments and the various functionalities associated therewith, are disclosed with particularity in the attached drawing sheet, FIGS. 1-10. Applicant submits that those of ordinary skill in the art will recognize and be able to appreciate the advantages of the apparatus, methods, and system.

The foregoing description is intended primarily for illustrative purposes, and is not intended to include all possible aspects of the present invention. Moreover, while the invention has been shown and described with respect to a presently preferred examples, those of ordinary skill in the art will appreciate that the description, and various other modifications, omissions and additions, so long as in the general form and detail, may be made without departing from either the spirit or scope thereof.

I claim:

1. A method for conditioning a flow of fluid between flow sensor orifices comprising the steps of:
    positioning a flow restriction member having an integrated two faced flange, the two-faced flange comprising a faceplate member having two sealing surfaces disposed around the flow restriction member, the first sealing surface on one side of the faceplate member and the second sealing surface on the other side of the faceplate member, and a hub not otherwise disposed by the sealing surfaces of the two faced flange, and a torus wedge structure having a sill within a fluid flow path, using the two faced flange to position the flow restriction member a distance from the flow sensor orifices;
    aligning the flow restriction member within the fluid flow path using the hub to align the vortex of the sill of the torus wedge structure perpendicular to the fluid flow path;
    sealing the flow restriction member within the fluid flow path, using the integrated two faced flange to effect the seal;
    restricting the flow of fluid within the fluid flow path;
    wherein the step of restricting comprises the steps of:
        progressively reducing the cross-sectional area of the fluid flow path;
        maintaining a constant cross-sectional area of the fluid flow path after the fluid flow path has been progressively reduced; and
        increasing the cross-sectional area of the fluid flow path after the fluid flow path has been maintained at a constant cross-sectional area.

2. The method of claim 1, further comprising the step of:
    communicating information related to the flow restriction member after the flow restriction member is positioned, aligned, and sealed within the fluid flow path.

3. A system for conditioning a flow of fluid comprising:
    a single integrated structural member, further comprising:
        a means for restricting the flow of fluid within the fluid flow path;
        a means for positioning the flow restriction means within a fluid flow path;
        a means for aligning the flow restriction means within the fluid flow path; and
        a means for sealing the flow restriction means within the fluid flow path;
    wherein the means for restricting comprises:
        means for progressively reducing the cross-sectional area of the fluid flow path;
        means for maintaining a constant cross-sectional area of the fluid flow path after the fluid flow path has been progressively reduced; and
        means for increasing the cross-sectional area of the fluid flow path after the fluid flow path has been maintained at a constant cross-sectional area; and
    wherein the means for maintaining a constant cross-sectional area of the fluid flow path comprises a sill member;
    wherein the means for sealing comprises a two-faced faceplate flange having two sealing surfaces disposed radially around the means for restricting; and
    wherein the means for aligning comprises a hub not otherwise disposed by the sealing surfaces, the hub aligning and maintaining the vortex of the sill member perpendicular to the fluid flow path.

4. The system of claim 3, further comprising:
    means for communicating information related to the flow restriction member after the flow restriction member is positioned, aligned, and sealed within the fluid flow path.

5. The device of claim 3 wherein the beta ratio of the cross-sectional area of the orifice of the sill member to the cross-sectional area of the unreduced cross-sectional area of the fluid flow path is greater than or equal to 0.1 and less than 0.2.

6. The device of claim 3 wherein the beta ratio of the cross-sectional area of the orifice of the sill member to the cross-sectional area of the unreduced cross-sectional area of the fluid flow path is greater than 0.75 and less than or equal to 0.9.

7. The system of claim 3, wherein said means for sealing comprises circular ridges disposed on the faces of the flange.

8. A device for conditioning a flow of fluid comprising:
    a flow restriction member having a cylindrical body and two ends;
    a two-faced flange disposed radially about the body of the flow restriction member, the two-faced flange comprising a faceplate member having two sealing surfaces disposed around the flow restriction member, the first sealing surface on one side of the faceplate member and the second sealing surface on the other side of the faceplate member;
    a hub formed by the outer surface of the body not otherwise disposed by the sealing surfaces of the two-faced flange;
    wherein the flow restriction member further comprises:
        a first conically-shaped circular torus opening disposed on one end of the body, the torus opening progressively reducing in cross-sectional area along the longitudinal axis into the body;
        a second conically-shaped circular torus opening disposed on the other end of the body, the torus opening progressively reducing in cross-sectional area along the longitudinal axis into the body; and a sill opening disposed between the first and the second torus openings, the sill opening of constant cross-sectional area along the longitudinal axis of the body.

9. The device of claim 8, further comprising:

a handle disposed radially from the two-faced flange, whereby information related to the flow restriction member is communicated after the flow restriction member is positioned, aligned, and sealed within the fluid flow path.

10. The device of claim 9, further comprising:

an RFID tag disposed within the handle, whereby information related to the flow restriction member is communicated.

11. The device of claim 8, further comprising:

an RFID tag disposed radially from the body of the flow restriction member, whereby information related to the flow restriction member is communicated after the flow restriction member is positioned, aligned, and sealed within the fluid flow path.

12. The device of claim 8 wherein the beta ratio of the cross-sectional area of the sill opening to the cross-sectional area of the unreduced cross-sectional area of the first torus opening is greater than or equal to 0.1 and less than 0.2.

13. The device of claim 8 wherein the beta ratio of the cross-sectional area of the sill opening to the cross-sectional area of the unreduced cross-sectional area of the first torus opening is greater than 0.75 and less than or equal to 0.9.

14. A device for conditioning a flow of fluid comprising:

a flow restriction member having a cylindrical body and two ends;

a two-faced flange disposed radially about the body of the flow restriction member, the two-faced flange comprising a faceplate member having two sealing surfaces disposed around the flow restriction member, the first sealing surface on one side of the faceplate member and the second sealing surface on the other side of the faceplate member;

a hub formed by the outer surface of the body not otherwise disposed by the sealing surfaces of the two-faced flange;

wherein the flow restriction member further comprises:

a first conically-shaped circular torus opening disposed on one end of the body, the torus opening progressively reducing in cross-sectional area along the longitudinal axis into the body;

a second conically-shaped circular torus opening disposed on the other end of the body, the torus opening progressively reducing in cross-sectional area along the longitudinal axis into the body; and a sill opening disposed between the first and the second torus openings, the sill opening of constant cross-sectional area along the longitudinal axis of the body; and wherein the outside diameter of the hub is configured for receiving into the inside diameter of a pipe and positioned and arranged to align the sill opening perpendicular to the fluid flow path of the pipe.

15. The device of claim 14, further comprising:

a handle disposed radially from the two-faced flange, whereby information related to the flow restriction member is communicated after the flow restriction member is positioned, aligned, and sealed within the fluid flow path.

16. The device of claim 15, further comprising:

an RFID tag disposed within the handle, whereby information related to the flow restriction member is communicated.

17. The device of claim 14, further comprising:

an RFID tag disposed radially from the body of the flow restriction member, whereby information related to the flow restriction member is communicated after the flow restriction member is positioned, aligned, and sealed within the fluid flow path.

* * * * *